(12) United States Patent
Mohseni et al.

(10) Patent No.: US 11,809,961 B2
(45) Date of Patent: Nov. 7, 2023

(54) INHOMOGENEOUS QUANTUM ANNEALING SCHEDULES

(71) Applicant: Google LLC, Mountain View, CA (US)

(72) Inventors: Masoud Mohseni, Redondo Beach, CA (US); Hartmut Neven, Malibu, CA (US)

(73) Assignee: Google LLC, Mountain View, CA (US)

( * ) Notice: Subject to any disclaimer, the term of this patent is extended or adjusted under 35 U.S.C. 154(b) by 302 days.

(21) Appl. No.: 16/957,668

(22) PCT Filed: Dec. 28, 2018

(86) PCT No.: PCT/US2018/067977
§ 371 (c)(1),
(2) Date: Jun. 24, 2020

(87) PCT Pub. No.: WO2019/133889
PCT Pub. Date: Jul. 4, 2019

(65) Prior Publication Data
US 2020/0334564 A1    Oct. 22, 2020

Related U.S. Application Data (60) Provisional application No. 62/612,134, filed on Dec. 29, 2017.

(51) Int. Cl.
*G06N 10/00* (2022.01)
*G06F 9/48* (2006.01)
*G06N 10/60* (2022.01)

(52) U.S. Cl.
CPC ........... *G06N 10/00* (2019.01); *G06F 9/4881* (2013.01); *G06N 10/60* (2022.01)

(58) Field of Classification Search
CPC ........ G06N 10/00; G06F 9/4881; G06F 17/11
See application file for complete search history.

(56) References Cited

U.S. PATENT DOCUMENTS

| | | | |
|---|---|---|---|
| 11,222,149 B2 * | 1/2022 | Barzegar | G06N 10/00 |
| 2006/0147154 A1 * | 7/2006 | Thom | G06N 10/00 |
| | | | 385/37 |

(Continued)

FOREIGN PATENT DOCUMENTS

| | | |
|---|---|---|
| CA | 2724617 | 11/2009 |
| WO | WO2015103375 | 7/2015 |

(Continued)

OTHER PUBLICATIONS

PCT International Preliminary Report on Patentability in International Appln No. PCT/US2018/067988, dated Jun. 30, 2020, 13 pages.

(Continued)

*Primary Examiner* — Dzung D Tran
(74) *Attorney, Agent, or Firm* — Fish & Richardson P.C.

(57) ABSTRACT

Methods and apparatus for performing quantum annealing using a quantum system. In one aspect, a method includes controlling the quantum system such that a total Hamiltonian characterizing the quantum system evolves from an initial quantum Hamiltonian to a problem quantum Hamiltonian, wherein controlling the quantum system comprises applying an inhomogeneous driving field to the quantum system to drive the quantum system across a quantum phase transition.

41 Claims, 5 Drawing Sheets

(56) References Cited

U.S. PATENT DOCUMENTS

| | | |
|---|---|---|
| 2006/0147157 A1 | 7/2006 | Manning et al. |
| 2006/0225165 A1 | 10/2006 | Brink et al. |
| 2008/0162613 A1 | 7/2008 | Amin |
| 2009/0299947 A1* | 12/2009 | Amin .................... B82Y 10/00 706/13 |
| 2012/0023053 A1 | 1/2012 | Harris et al. |
| 2013/0088224 A1 | 4/2013 | Koizumi |
| 2014/0250288 A1 | 9/2014 | Roy |

FOREIGN PATENT DOCUMENTS

| | | |
|---|---|---|
| WO | WO2015143439 | 9/2015 |
| WO | WO2016011440 | 1/2016 |
| WO | WO 2017111937 | 6/2017 |
| WO | WO2017189052 | 11/2017 |

OTHER PUBLICATIONS

PCT International Search Report and Written Opinion in International Appln No. PCT/US2018/067977, dated Apr. 17, 2019, 20 pages.
Rams et al, "Inhomogeneous quasi-adiabatic driving of quantum critical dynamics in weakly disordered spin chains" New Journal of Physics, Dec. 2016, 13 pages.
EP Office Action in European Application No. 18840133.5, dated Aug. 6, 2021, 7 pages.
AU Office Action in Australian Application No. 2018395427, dated Feb. 4, 2021, 4 pages.
AU Office Action in Australian Application No. 2021225163, dated Jun. 30, 2022, 3 pages.
CA Office Action in Canadian Application No. 3,087,247, dated Sep. 8, 2021, 3 pages.
Barankov et al., "Optimal Nonlinear Passage Through a Quantum Critical Point," Phys. Rev. Lett. 101, Aug. 14, 2008, 4 pages.
Caneva et al., "Adiabatic quantum dynamics of a random Ising chain across its quantum critical point," Phys. Rev. B 76, Oct. 23, 2007, 9 pages.
Chesler et al., "Defect Formation beyond Kibble-Zurek Mechanism and Holography," Phys. Rev. X 5, May 14, 2015, 13 pages.
Cincio et al., "Dynamics of a quantum phase transition with decoherence: Quantum Ising chain in a static spin environment," Phys. Rev. B, 79, Mar. 23, 2009, 9 pages.
Cirac et al., "Goals and opportunities in quantum simulation," Nature Phys., Apr. 2, 2012, pp. 264-266.
Damski, "Counterdiabatic driving of the quantum Ising model," J. Stat. Mech, Dec. 22, 2014, 15 pages.
Das et al., "Colloquium: Quantum annealing and analog quantum computation," Rev. Mod. Phys. 80, 1061, Sep. 5, 2008, 21 pages.
De Grandi et al., "Quench dynamics near a quantum critical point," Phys. Rev. B 81, Jan. 19, 2010, 4 pages.
Del Campo et al., "Assisted Finite-Rate Adiabatic Passage Across a Quantum Critical Point: Exact Solution for the Quantum Ising Model," Phys. Rev. Lett. 109, Sep. 13, 2012, 5 pages.
Del Campo et al., "Causality and non-equilibrium second-order phase transitions in inhomogeneous systems," J. Phys.: Condens. Matt. 25, Sep. 11, 2013, 11 pages.
Del Campo et al., "Controlling quantum critical dynamics of isolated systems," Eur. Phys. J. Special Topics 224, Feb. 5, 2015, pp. 189-203.
Del Campo et al., "Structural Defects in Ion Chains by Quenching the External Potential: The Inhomogeneous Kibble-Zurek Mechanism," Phys. Rev. Lett. 105, Aug. 11, 2010, 4 pages.
Del Campo et al., "The inhomogeneous Kibble-Zurek mechanism: vortex nucleation during Bose-Einstein condensation," New J. Phys. 13, Aug. 2011, 13 pages.
Del Campo et al., "Universality of phase transition dynamics: Topological defects from symmetry breaking," Int. J. Mod. Phys. A, Mar. 21, 2014, 49 pages.

Dora et al., "Absence of Orthogonality Catastrophe after a Spatially Inhomogeneous Interaction Quench in Luttinger Liquids," Phys. Rev. Lett. 115, Aug. 27, 2015, 5 pages.
Doria et al., "Optimal Control Technique for Many-Body Quantum Dynamics," Phys. Rev. Lett. 106, May 11, 2011, 4 pages.
Dutta e al., "Anti-Kibble-Zurek Behavior in Crossing the Quantum Critical Point of a Thermally Isolated System Driven by a Noisy Control Field," arXiv, Aug. 19, 2016, 7 pages.
Dziarmaga et al., "Adiabatic dynamics of an inhomogeneous quantum phase transition: the case of a z>1 dynamical exponent," New J. Phys. 12, Oct. 5, 2010, 20 pages.
Dziarmaga et al., "Symmetry Breaking with a Slant: Topological Defects after an Inhomogeneous Quench," Phys. Rev. Lett. 82, Jun. 14, 1999, 4 pages.
Dziarmaga, "Dynamics of a quantum phase transition and relaxation to a steady state," Advances in Physics, 2010, 127 pages.
Dziarmaga, "Dynamics of a quantum phase transition in the random Ising model: Logarithmic dependence of the defect density on the transition rate," Phys. Rev. B 74 064416, Aug. 17, 2006, 5 pages.
Dziarmaga, "Dynamics of a Quantum Phase Transition: Exact Solution of the Quantum Ising Model," Phys. Rev. Lett 95, Dec. 9, 2005, 4 pages.
Fisher et al., "Distributions of gaps and end-to-end correlations in random transverse-field Ising spin chains," Phys. Rev. B 58, Oct. 1, 1998, 11 pages.
Fisher, "Critical behavior of random transverse-field Ising spin chains," Phys. Rev. Lett. 69, Mar. 1, 1995, 51 pages.
Francuz et al., "Space and time renormalization in phase transition dynamics," Phys. Rev. B 93, Feb. 18, 2016, 14 pages.
Kato, "On the Adiabatic Theorem of Quantum Mechanics," J. Phys. Soc. Jpn. 5, 1950, 5 pages.
Kibble et al., "On phase ordering behind the propagating front of a second-order transition," JETP Lett. Jan. 1997, 6 pages.
Kibble, "Topology of cosmic domains and strings," Journal of Physics A: Mathematical and General, 1976, 13 pages.
Kolodrubetz et al., "Nonequilibrium Dynamic Critical Scaling of the Quantum Ising Chain," Phys. Rev. Lett. 109, Jul. 2, 2012, 5 pages.
Lidar et al., "Adiabatic approximation with exponential accuracy for many-body systems and quantum computation," J. Math. Phys. 50, Sep. 2, 2009, 27 pages.
Murg et al., "Adiabatic time evolution in spin systems," Phys. Rev. A 69, Apr. 28, 2004, 11 pages.
Office Action in Candian Appln. No. 3087247, dated Mar. 10, 2023, 5 pages.
Patane et al., "Adiabatic Dynamics in Open Quantum Critical Many-Body Systems," Phys. Rev. Lett. 101, Oct. 23, 2008, 4 pages.
Polkovnikov et al., "Colloquium: Nonequilibrium dynamics of closed interacting quantum systems," Rev. Mod. Phys., Aug. 15, 2011, 21 pages.
Polkovnikov, "Universal adiabatic dynamics in the vicinity of a quantum critical point," Phys. Rev. B 72, Oct. 17, 2005, 4 pages.
Power et al., "Dynamical symmetry breaking with optimal control: Reducing the number of pieces," Phys. Rev. B 88, Dec. 17, 2013, 6 pages.
Rams et al., "Inhomogeneous quasi-adiabatic driving of quantum critical dynamics in weakly disordered spin chains," New J. Phys. 18, Dec. 23, 2016, 13 pages.
Saberi et al., "Adiabatic tracking of quantum many-body dynamics," Phys. Rev. A 90, Dec. 1, 2014, 5 pages.
Sau et al., "Suppressing defect production during passage through a quantum critical point," Phys. Rev. B 90, Sep. 22, 2014, 7 pages.
Schaller, "Adiabatic preparation without quantum phase transitions," Phys. Rev. A 78, Sep. 23, 2008, 8 pages.
Sen et al., "Defect Production in Nonlinear Quench across a Quantum Critical Point," Phys. Rev. Lett. 101, Jul. 3, 2008, 4 pages.
Sonner et al., "Universal far-from-equilibrium dynamics of a holographic superconductor," Nat. Commun. 6, Jun. 23, 2015, 10 pages.
Suzuki, "General Decomposition Theory of Ordered Exponentials," Proc. Jpn. Acad. 69 B, 1993, 6 pages.
Takahashi, "Transitionless quantum driving for spin systems," Phys. Rev., Jun. 12, 2013, 9 pages.

(56) References Cited

OTHER PUBLICATIONS

Young et al., "Numerical study of the random transverse-field Ising spin chain," Phys. Rev. B 53, Apr. 1, 1996, 13 pages.
Zurek et al., "Dynamics of a Quantum Phase Transition," Phys. Rev. Lett 95, Sep. 1, 2005, 4 pages.
Zurek et al., "Phase transition in space: how far does a symmetry bend before it breaks?," Phil. Trans. R. Soc. A 366, Jun. 5, 2008, 20 pages.
Zurek, "Causality in Condensates: Gray Solitons as Relics of BEC Formation," Phys. Rev. Lett. 102, Mar. 12, 2009, 4 pages.
Zurek, "Cosmological experiments in condensed matter systems," Phys. Rep. 276, Nov. 1996, 276(4):177-221.
Office Action in Chinese Appln. No. 201880084818.2, dated Mar. 25, 2023, 40 pages (with English translation).

* cited by examiner

INHOMOGENEOUS QUANTUM ANNEALING SCHEDULES

CROSS-REFERENCE TO RELATED APPLICATIONS

This application is a National Stage Application under 35 U.S.C. § 371 and claims the benefit of International Application No. PCT/US2018/067977, filed Dec. 28, 2018, which claims priority to U.S. Application No. 62/612,134, filed Dec. 29, 2017, the disclosure of which is incorporated herein by reference.

BACKGROUND

This specification relates to quantum computing.

Quantum annealing is a procedure that may be used to find the global minimum of a given objective function over a given set of candidate solutions using quantum fluctuations. Quantum annealing begins with a quantum system in a quantum-mechanical superposition of all candidate states with equal weights. The system evolves following the time-dependent Schrödinger equation. The amplitudes of all candidate states change according to the time-dependent strength of a transverse field, which causes quantum tunneling between states.

In adiabatic quantum annealing, the system stays close to the ground state of the instantaneous Hamiltonian if the rate of change of the transverse-field is slow enough. The transverse field is turned off, and the system has reached a ground state that corresponds to the solution to the original optimization problem.

SUMMARY

This specification describes methods and systems for performing quantum annealing using inhomogeneous quantum annealing schedules.

In general, one innovative aspect of the subject matter described in this specification can be implemented in a method for performing algorithmic quantum annealing using a quantum system, comprising: controlling the quantum system such that a total Hamiltonian characterizing the quantum system evolves from an initial quantum Hamiltonian to a problem quantum Hamiltonian, wherein controlling the quantum system comprises: the energy spectrum of the problem Hamiltonian encodes a solution to a computational task, and controlling the quantum system comprises applying an inhomogeneous driving field to the quantum system.

Other implementations of this aspect include corresponding classical or quantum computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations controlling the quantum system further comprises: driving, by the applied inhomogeneous driving field, the quantum system across a quantum phase transition.

In some implementations the method further comprises performing one or more measurements of the energy of the quantum system to determine the solution to the computational task. The computational task may be an optimization task.

In some implementations the quantum system comprises a spin system, and wherein the inhomogeneous driving field comprises a transverse field that can be locally modulated for each spin in the spin system.

In some implementations applying an inhomogeneous driving field to the quantum system causes quantum fluctuations, and the quantum system responds to the quantum fluctuations within multiple clusters.

In some implementations the inhomogeneous driving field is given by:

$$g(n,t) = \omega_0 g_0(n) v_0(t) + \Sigma_{k=1}^{M} \omega_k g_k(\|n-n_k\|-v_k(n,t)t)$$

wherein $g_0$ represents a time-independent global magnetic field which has a spatial structure, $v_0(t)$ represents a critical-front velocity which is spatially uniform and has non-linear dependence to time, $g_k$ represents the non-separable spatiotemporal modulation of the drive field, and M represents the total number of clusters.

In some implementations the inhomogeneous driving field is characterized by set of effective hyper-parameters describing the spatial structure and velocities of a critical front, the hyper-parameters including (i) a shape in space, (ii) horizontal velocity, and (iii) vertical velocity.

In some implementations the (i) horizontal velocity, (ii) vertical velocity, and (iii) inhomogeneity slope are given by $$v^v(n,t) = -\partial g(n,t)/\partial t, \ v_k^h(n,t) = \partial n(g_{fix}, t)/\partial t, \text{ and}$$

$$\alpha(n,t) = \frac{\partial g(n,t)}{\partial n}.$$

In some implementations the inhomogeneous driving field comprises space and time separated inhomogeneity. The inhomogeneous driving field may be given by $g(n,t) = g_0(n)v_0(t)$. The inhomogeneous driving field may include a periodic spatial inhomogeneity combined with spatially independent time-local inhomogeneity. The inhomogeneous driving field may comprise a single standing wave. The (i) horizontal velocity, (ii) vertical velocity, and (iii) inhomogeneity slope may be given by $$v^v(t) = a\sin(kn + \varphi)\dot{v}_o(t)$$

$$v^h(n,t) = \frac{-ag_{fix}\dot{v}_o(t)}{kv_o^2(t)\sqrt{1-\left[\frac{g_{fix}}{av_o(t)}\right]^2}}$$

$$\alpha(n,t) = ak\cos(kn + \varphi)v_o(t).$$

In some implementations the inhomogeneous driving field comprises spatiotemporal inhomogeneities. The inhomogeneous driving field may comprise a locally linear function. The inhomogeneous driving field may be given by $g(n,t) = g_c\{1 + \Sigma_{k=2}^{M}\omega_k \tanh[\theta_k(\|n-n_k\|-v_k(n)t)]\}$. The activation function $\tanh[\theta_k(\|n-n_k\|-v_k(n)t)]$ may be linearized in each cluster near the quantum critical point.

In some implementations controlling the quantum system further comprises applying a causality control strategy.

In some implementations the inhomogeneous driving field comprises one or more critical fronts, and wherein the velocities of the one or more critical fronts are below a threshold value that conserves effective inhomogeneity.

In some implementations applying the inhomogeneous driving field comprises applying an inhomogeneous driving field that creates an effective gap between low energy states and higher energy states of the quantum system.

In general, another innovative aspect of the subject matter described in this specification can be implemented in a method for engineering first and second-order quantum phase transitions in a disordered quantum system, the method comprising: controlling the disordered quantum system using inhomogeneous control fields, wherein the inhomogeneous control fields create an effective gap between low energy states and higher energy states of the quantum system.

In some implementations the phase transitions comprise non-adiabatic phase transitions.

Other implementations of this aspect include corresponding classical or quantum computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

In general, another innovative aspect of the subject matter described in this specification can be implemented in a method for performing algorithmic quantum annealing using a quantum system, comprising: controlling the quantum system such that a total Hamiltonian characterizing the quantum system evolves from an initial quantum Hamiltonian to a problem quantum Hamiltonian, wherein controlling the quantum system comprises: applying an inhomogeneous driving field to the quantum system; and driving, by the inhomogeneous driving field, the quantum system across a quantum phase transition.

Other implementations of this aspect include corresponding classical or quantum computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the energy spectrum of the problem Hamiltonian encodes a solution to a computational task. The method may further comprise performing one or more measurements of the energy of the quantum system to determine the solution to the computational task. The computational task may be an optimization task.

In some implementations the quantum system comprises a spin system, and wherein the inhomogeneous driving field comprises a transverse field that can be locally modulated for each spin in the spin system.

In some implementations applying an inhomogeneous driving field to the quantum system causes quantum fluctuations, and the quantum system responds to the quantum fluctuations within multiple clusters.

In some implementations the inhomogeneous driving field is given by:

$$g(n,t) = \omega_0 g_c(n) v_0(t) + \Sigma_{k=1}^M \omega_k g_k(\|n-n_k\| - v_k(n,t)t)$$

wherein $g_0$ represents a time-independent global magnetic field which has a spatial structure, $v_0(t)$ represents a critical-front velocity which is spatially uniform and has non-linear dependence to time, $g_k$ represents the non-separable spatiotemporal modulation of the drive field, and M represents the total number of clusters.

In some implementations the inhomogeneous driving field is characterized by set of effective hyper-parameters describing the spatial structure and velocities of a critical front, the hyper-parameters including (i) a shape in space, (ii) horizontal velocity, and (iii) vertical velocity.

In some implementations the (i) horizontal velocity, (ii) vertical velocity, and (iii) inhomogeneity slope are given by $$v^v(n,t) = -\partial g(n,t)/\partial t, \; v_k^h(n,t) = \partial n(g_{fix},t)/\partial t, \text{ and}$$

$$\alpha(n,t) = \frac{\partial g(n,t)}{\partial n}.$$

In some implementations the inhomogeneous driving field comprises space and time separated inhomogeneity. The inhomogeneous driving field may be given by $g(n,t) = g_0(n)v_0(t)$. The inhomogeneous driving field may include a periodic spatial inhomogeneity combined with spatially independent time-local inhomogeneity. The inhomogeneous driving field may comprise a single standing wave. The (i) horizontal velocity, (ii) vertical velocity, and (iii) inhomogeneity slope may be given by $$v^v(t) = a\sin(kn + \varphi)\dot{v}_o(t)$$

$$v^h(n,t) = \frac{-ag_{fix}\dot{v}_o(t)}{kv_o^2(t)\sqrt{1 - \left[\frac{g_{fix}}{av_o(t)}\right]^2}}$$

$$\alpha(n,t) = ak\cos(kn + \varphi)v_o(t).$$

In some implementations the inhomogeneous driving field comprises spatiotemporal inhomogeneities. The inhomogeneous driving field may comprise a locally linear function. The inhomogeneous driving field may be given by $g(n,t) = g_c\{1 + \Sigma_{k=2}^M \omega_k \tanh[\theta_k(\|n-n_k\| - v_k(n)t)]\}$. The activation function $\tanh[\theta_k(\|n-n_k\| - v_k(n)t)]$ may be linearized in each cluster near the quantum critical point.

In some implementations controlling the quantum system further comprises applying a causality control strategy.

In some implementations the inhomogeneous driving field comprises one or more critical fronts, and wherein the velocities of the one or more critical fronts are below a threshold value that conserves effective inhomogeneity.

In some implementations applying the inhomogeneous driving field comprises applying an inhomogeneous driving field that creates an effective gap between low energy states and higher energy states of the quantum system.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Controlling the dynamics of quantum many-body systems is a primary challenge in condensed matter physics and quantum control. Such complex quantum systems have a large parameter space and unusual dynamical properties that makes them very hard to simulate and control as they are driven through critical regions. For example, difficulties arise from the fact that these systems generally contain a high degree of disorders and effectively low dimensions such that they are not prone to exact analytical treatment or mean-field approximations.

Adiabatic quantum computation has been developed as a particular computational paradigm that utilizes the continuous-time dynamics of driven many-body quantum systems for solving optimization tasks. In this model, the solution of a hard combinatorial optimization problem is encoded in the ground state of an interacting many-body quantum system which can be prepared adiabatically from an initially trivial ground state, provided that time evolution is much longer than the inverse of the minimum gap square.

One of the major challenges to adiabatic quantum computation is that for many realistic problems the analog quantum annealer will inevitably contain a significant amount of quenched disorders that smear the corresponding quantum phase transitions for pure systems. Therefore, the required time-scale for satisfying the adiabatic limit could grow as a stretch exponential due to Griffiths singularity, even in the absence of any first order phase transitions.

The Griffiths effects have pronounced effects in finite-dimensional quantum systems much stronger than the classical counterparts. In fact, near-term quantum processors are good examples of low-dimensional quantum systems due to the inherent locality of physical interactions and geometrical constraints on the degree of connectivity. After the embedding of a computational problem into a quantum annealer, the quantum processor will react to quantum fluctuations inhomogeneously at the physical level. Consequently, near-term quantum processors will typically experience locally inhomogeneous and smeared first and second order phase transitions, even if they are driven with an external field that is homogeneous in space. In particular, annealing schedules exhibit multiple vanishing gaps between the ground state and first excited state, leading to exponentially long annealing time-scales.

In practice, the annealing time-scale is often finite—inherently violating the adiabaticity condition, even for finite size systems. This leads to the emergence of domain walls or topological defects that emerge at a relatively wide effective quantum critical region. This is in sharp contrast to a single well-defined quantum critical point for pure system, where their density of defects can be estimated via Kibble-Zurek Mechanism in the thermodynamics limit.

Currently, there is no way to guarantee the quality of solutions, given finite space-time physical resources, and there is no constructive or algorithmic way to improve performance for such analog quantum information processors within a given accuracy.

This specification describes systems and methods for engineering quantum phase transitions in disordered systems using inhomogeneous control fields that enforce spatially-induced gaps between low energy states (e.g., the ground or first excited state) and higher energy states (e.g., second excited state or higher excited states). In particular, this specification describes different classes of spatial and/or temporal inhomogeneous quantum annealing schedules that drive strongly disordered quantum spin chains across a quantum phase transition and minimize the residual energy of the final state. This is achieved by creating a governing Hamiltonian with spatially multi-critical-fronts that can synchronize the local phase transitions in space and time. In each local region, the number of spins that simultaneously experience the critical dynamics is controlled by the length scale and shape of the inhomogeneity in which the magnetic field is modulated.

Performing Inhomogeneous Quantum Annealing

Figure 1:
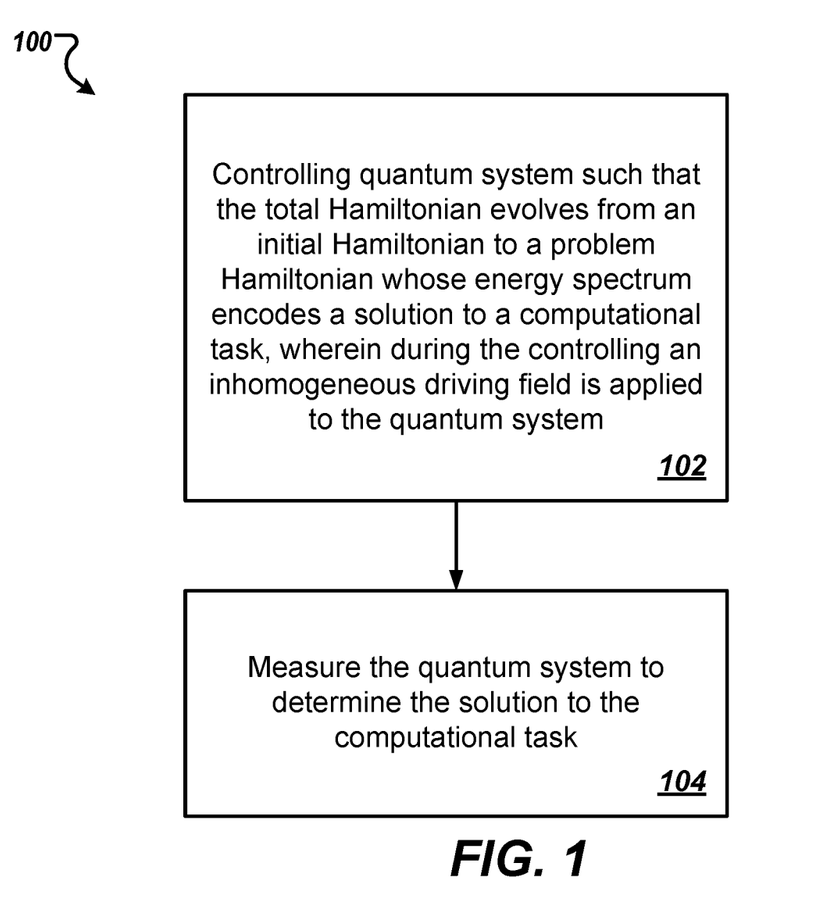
FIG. 1 is a flow diagram of an example process for performing inhomogeneous quantum annealing.

FIG. 1 is a flow diagram of an example process 100 for performing inhomogeneous quantum annealing. For convenience, the process 100 will be described as being performed by quantum hardware in communication with control electronics located in one or more locations. For example, the quantum annealing device 300 of FIG. 3, appropriately programmed in accordance with this specification, can perform the process 100.

Performing algorithmic quantum annealing includes controlling a quantum system, e.g., a spin system or higher dimensional system, such that a Hamiltonian $H_{total}$ characterizing the quantum system evolves from an initial quantum Hamiltonian $H_i$ to a problem quantum Hamiltonian $H_p$ (step 102). The energy spectrum of $H_p$ may encode a solution to a computational task, e.g., an optimization task. For example, a solution to the computational task maybe be encoded into the ground state of the quantum system. Measurements of the energy of the quantum system may then be performed to determine the solution to the computational task (step 104).

The algorithmic quantum annealing is performed according to an inhomogeneous quantum annealing schedule. That is, controlling the quantum system includes applying an inhomogeneous driving field to the quantum system. The inhomogeneous driving field is designed such that application of the inhomogeneous driving field to the quantum system creates an effective gap between low energy states and higher energy states of the quantum system. Application of the inhomogeneous driving field drives the quantum system across a quantum phase transition. The inhomogeneous driving field is defined as a function of fixed total quench time (annealing time) $T=\tau_Q$ and a target precision for approximating the ground state of the quantum system (or a target state in which a solution to the computational task is encoded.)

As a non-limiting example, in some implementations the quantum system may be a system of N spins. A Hamiltonian for a system of N spins under an inhomogeneous drive field can be written as:

$$H_{tot}(t) = -\sum_{n=1}^{N} g(n,t)\sigma_n^x - \sum_{\langle n,m \rangle}^{N} J_{nm}\sigma_n^z\sigma_m^z$$

where g(n,t) represents the inhomogeneous drive field, e.g., a transverse field that can be locally modulated for each spin in the spin system, $\sigma_n^x$, $\sigma_n^z$ represent spin variables with respective Pauli X and Z matrices, and $J_{nm}$ represents the interaction between spins at sites n and m. For pure systems $J_{nm}$ may be constant for each pair of sites n and m, i.e., $J_{nm}=J$. In other systems the set $\{J_{nm}\}$ for each site n and m can represent any instance of disorders. This Hamiltonian can be realized using near-term quantum annealing technologies.

The target precision for approximating the ground state of the spin system characterized by $H_{tot}(t)$ is defined by a normalized residual energy as $$\epsilon = \frac{1}{N}|\langle\psi(\tau_Q)|H_{tot}|\psi(\tau_Q)\rangle - \langle\psi_{gs}|H_{tot}|\psi_{gs}\rangle|$$

where $|\psi(\tau_Q)\rangle$ represents the quantum state of the system at the final annealing time $\tau_Q$ and $|\psi_{gs}\rangle$ represents the ground state of the time-independent Hamiltonian (the problem Hamiltonian $H_p = -\Sigma_{\langle n,m \rangle}^N J_{nm} \sigma_n^z \sigma_m^z$ with eigenvalue $E_g = \langle\psi_{gs}|H_{tot}|\psi_{gs}\rangle$).

For any instance of disorders $\{J_{nm}\}$, as the system is driven toward an ideal quantum critical point (associated with the corresponding pure system) during application of the inhomogeneous driving field, the system responds to quantum fluctuations within distinct M clusters. These clusters are related to the emergence of rare local regions within the Griffiths phase. The number and locations of M can be estimated via a preprocessing step that grows linearly with the size of the chain for 1D systems, as described below with reference to FIG. 2.

The inhomogeneous driving field g(n,t) may be given by:

$$g(n,t) = \omega_0 g_0(n)v_0(t) + \sum_{k=1}^{M} \omega_k g_k(\|n - n_k\| - v_k(n,t)t)$$

wherein $g_0(n)$ represents a time-independent global magnetic field which has a spatial structure and $v_0(t)$ represents a critical-front velocity which is spatially uniform and has non-linear dependence to time, $g_k$ represents the non-separable spatiotemporal modulation of the drive field, and M represents a total number of clusters. The terms $\Sigma_{k=1}^{M}\omega_k g_k(\|n-n_k\|-v_k(n,t)t)$ characterize various spatiotemporal dependencies of travelling quantum-critical fronts, where $\|n-n_k\|$ represents a distance measure of site n from a center site $n_k$ per cluster, where the quantum fluctuation is triggered. The center of these spatiotemporal inhomogeneities can be shifted linearly in time by $v_k(n)t$ for each cluster k. However, in some cases the critical front motion can be constant for each cluster, e.g., $v_k(n,t)=v_k$. The shape and velocities of the quantum critical fronts can vary, as described in more detail below.

Shape and Velocity of Critical Fronts

The inhomogeneous driving field may be characterized by a set of effective hyper-parameters describing the spatial structure (e.g., local slope) and velocities (e.g., horizontal velocity and vertical velocity) of the critical front. The hyper-parameters include (i) a shape in space $\alpha$, (ii) horizontal velocity $v^h$, and (iii) vertical velocity $v^v$. The horizontal velocity, vertical velocity, and inhomogeneity slope may be defined by derivatives of the inhomogeneous driving field g(n, t) and $n(g_{fix}, t)$ via the below equations.

$$v^v(n,t) = -\partial g(n,t)/\partial t$$

$$v_k^h(n,t) = \partial n(g_{fix},t)/\partial t$$

$$\alpha(n,t) = \partial g(n,t)/\partial n$$

The above equations can be used to derive closed form expressions for different annealing schedules. Two qualitatively distinct classes for inhomogeneous quantum annealing are described below.

Type I Inhomogeneous Quantum Annealing Schedules: Space and Time Separated Inhomogeneity In some implementations the inhomogeneous driving field may take a general form where independent (or separated) space and time quantum fluctuations drive the annealing dynamics. That is, the general form of the inhomogeneous driving field may be given by $$g(n,t) = g_0(n)v_0(t).$$

In some implementations the inhomogeneous driving field may exhibit a periodic spatial inhomogeneity combined with spatially independent time-local inhomogeneity. For example, the inhomogeneous driving field may be given by $$g(n,t) = (\Sigma_{k=-\infty}^{\infty} a_k e^{ikn})v_0(t)$$

where each term in the spatial contribution corresponds to an estimated cluster size. An example of a quantum annealing schedule of this form includes a single standing wave, for example, $$g(n,t) = a\,\sin(kn+\phi)v_0(t)$$

where the cluster size is equal to $2\pi/k$ and $\phi$ sets the position of the first cluster.

In this Type I class of inhomogeneous annealing, the hyper-parameters horizontal velocity, vertical velocity, and inhomogeneity slope may be given by $$v^v(t) = a\sin(kn+\varphi)\dot{v}_o(t)$$
$$v^h(n,t) = \frac{-ag_{fix}\dot{v}_o(t)}{kv_o^2(t)\sqrt{1-[g_{fix}/av_o(t)]^2}}.$$
$$\alpha(n,t) = ak\cos(kn+\varphi)\dot{v}_o(t)$$

where for any fixed value of the transverse field $g_{fix}$, $$n = \frac{1}{k}\{\arcsin[g_{fix}/av_o(t)] - \phi\}.$$

Type II Inhomogeneous Quantum Annealing Schedules: Spatiotemporal Inhomogeneities In some implementations the inhomogeneous driving field may define a multi-critical front annealing schedule in k>1 clusters where critical fronts in each cluster move with speed $v_k(n)$ and are governed by a separate activation function $\tanh[\theta_k(n-n_k-v_k(n)t)]$. That is, the general form of the inhomogeneous driving field may be given by $$g(n, t) = g_c \left\{ 1 + \sum_{k=2}^{M} \omega_k \tanh[\theta_k(\|n - n_k\| - v_k(n)t)] \right\}$$

where $g_c$ represents the critical value of the transverse field, and $\theta_k \sim 1/\xi^{f(z,v)}$.

In some cases the activation function can be linearized in each cluster near the quantum critical point, e.g., $\tanh[\theta_k(n-v_k(n)t)]$ can be approximated as $\theta_k(n-v_k(n)t)$. Then, for each cluster, the inhomogeneous driving field may be given by $$g_k(n,t) = g_c\{1 + \theta_k(n - v_k(n)t)\}.$$

In this case of Type II class inhomogeneous annealing, the hyper-parameters horizontal velocity, vertical velocity, and inhomogeneity slope may be given by $$v^v(n,t) = g_c[1 - \tanh^2[\theta_k(n - v_k t)]]\theta_k v_k = \alpha_k(n,t) v_k$$

$$v_k^h(n,t) = v_k$$

$$\alpha_k(n,t) = g_c[1 - \tanh^2[\theta_k(n - v_k t)]]\theta_k$$

where $v_k$ represents an inhomogeneity constant for each cluster of the form $g_k(n,t) = g_c\{1+\tanh[\theta_k(n-v_k t)]\}$ which yields $$n = \tanh^{-1}\left(\frac{g_{k-fix}}{(g_c - 1)}\right) / \theta_k v v_k t.$$

In another cases the activation function can be approximated linearly near the critical point which yields $g_k(n,t) = g_c\{1 + \theta_k(n - v_k t)\}$ and $$n = \frac{g_{k-fix}}{(g_c - 1)} / \theta_k + v_k t.$$

The hyper-parameters horizontal velocity, vertical velocity, and inhomogeneity slope may then be given by $$v^v = g_c \theta_k v_k = \alpha_k v_k$$

$$v_k^h = v_k$$

$$\alpha_k = g_c \theta_k$$

In some implementations the velocities of the multiple critical fronts may be below a threshold value that conserves effective inhomogeneity.

Example Type I and Type II Quantum Annealing Schedules

Figure 2:
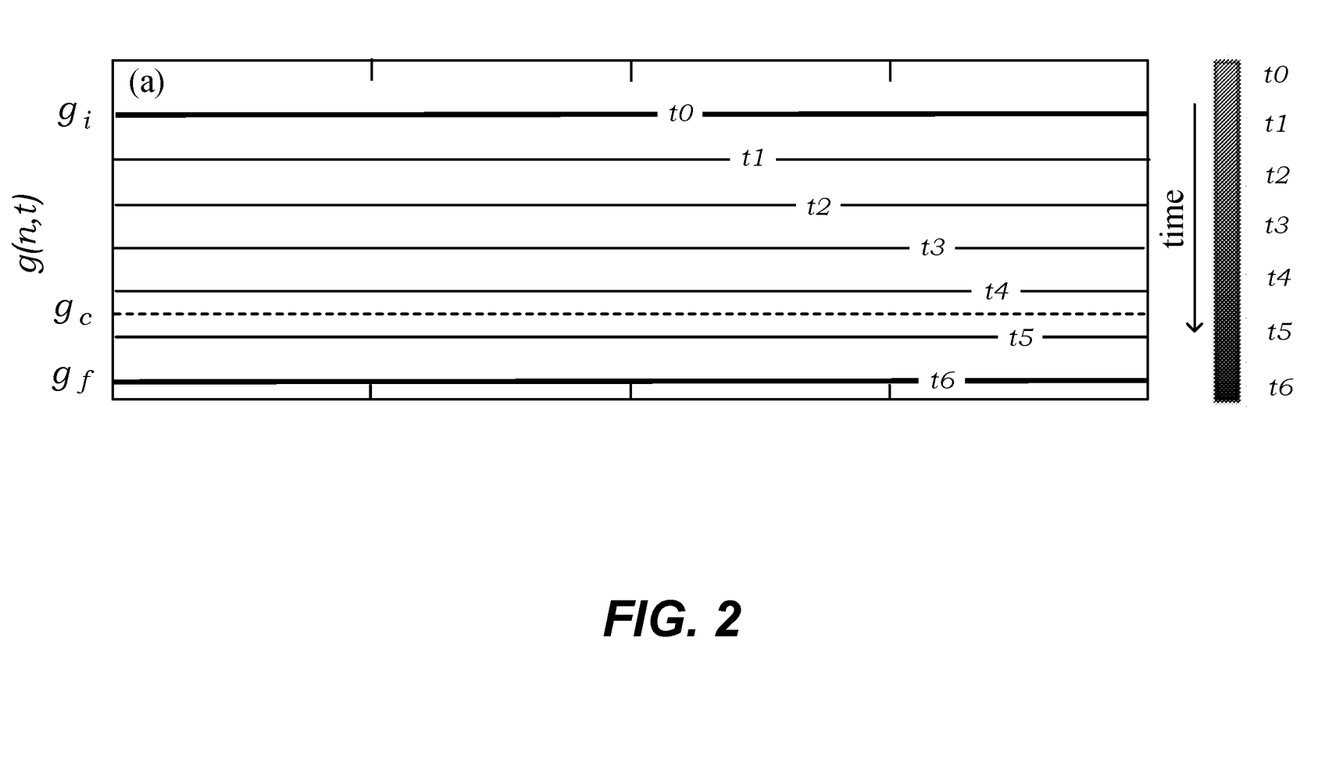
FIG. 2 shows example annealing schedules for a random instance of an Ising spin chain.

FIG. 2 illustrates three example annealing schedules (a), (b), (c) for a random instance of an Ising spin chain. In each schedule, the x-axis represents the Ising spin chain and the y-axis represents the transverse magnetic field. The different plotted lines indicate different snapshots of the time-dependent magnetic field applied to the Ising chain as it is driven from an initial value to a final value across a quantum critical point. The dashed lines, e.g., line 202, shows the critical value of the transverse field. Each plot includes a constant inhomogeneity slope of $\alpha = 1/8$.

The first example annealing schedule (a) shows a homogeneous annealing schedule.

The second example annealing schedule (b) shows a periodic driving of Type I inhomogeneous quantum annealing. The inhomogeneous driving field for the second example annealing schedule is given by $g(n,t) = g_i(1-t/T) + a \cos(kn) \sin(\pi t/T)$ where T represents the total evolution time. The second example annealing schedule includes 4 clusters 204a-d and amplitude $a=1$.

The third example annealing schedule (c) shows a multiple-critical front Type II inhomogeneous quantum annealing schedule. The third example annealing schedule includes 4 clusters 206a-d. The borders between clusters are tuned to coincide with the weakest values of $J_{n,n+1}$ for a given realization of disorder as a result of a preprocessing procedure.

In order to determine the number and positions of the clusters, a pre-processing step is performed. For a 1D geometry, the instantaneous local gap may be set by a single weak link. Weak links set the local time-scale needed for an adiabatic transition that divides the chain into two weakly interacting parts. Borders between clusters are placed at such links since (i) they require the longest time to align according to the weak coupling and (ii) the energy penalty for placing the defects there is the smallest. Therefore, the pre-processing step includes identifying the largest cluster (starting at the end of the chain or at the end of the previous cluster) that satisfies the condition $$\min_{cluster_k} (J_{n,n+1}) \cdot \kappa > v_k,$$

where $v_k$ represents the velocity of the critical front for the k-th cluster, and $\kappa$ represents a parameter fixing the exact value of the threshold (in some implementations $\kappa=2$.) This condition allows for an adiabatic transition as if the energy gap were set by single links only. If the condition is not satisfied, the considered candidate for the cluster is cut at its weakest link, creating a new smaller cluster where the condition can be checked again.

The procedure is repeated until the full spin chain is divided into clusters. As a result, for a total fixed annealing time, all velocity $v_k$ are cluster dependent, allowing for optimization of the computational parameters over the available time. For a cluster of size $L_k$ spin sites, the vertical velocity is given by $$v_k^v = \left(|g_f - g_i| + \frac{\alpha L_k}{2}\right) / T$$

for a given fixed total annealing time T. Each cluster can then be driven separately, and the inhomogeneous field brushes from the middle of each cluster to both ends at the same time. For each cluster spanning spins $n=1, 2, \ldots, L$ (counting from the beginning of the cluster) the magnetic field can be constructed as:

$$g(n, t) = \begin{cases} g_i & \left|n - \frac{L}{2}\right| - tv > \frac{(g_i - g_f)}{2\alpha} \\ \frac{(g_i + g_f)}{2} + \alpha\left(\left|n - \frac{L}{2}\right| - tv\right) & \left|n - \frac{L}{2}\right| - tv \leq \frac{(g_i - g_f)}{2\alpha} \\ g_f & \left|n - \frac{L}{2}\right| - tv < \frac{(g_f - g_i)}{2\alpha} \end{cases}$$

Example Hardware

Figure 3:
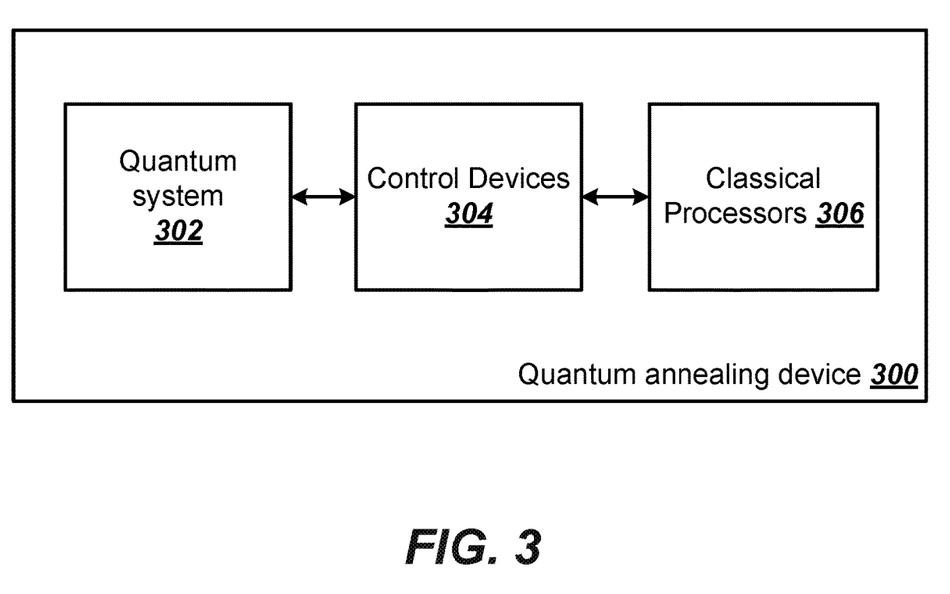
FIG. 3 shows an example quantum annealing device for performing inhomogeneous quantum annealing.

FIG. 3 shows an example quantum annealing device 300 for performing inhomogeneous quantum annealing. The example device 300 is an example of a device implemented as classical and/or quantum computer programs on one or more classical computers and/or quantum computing devices in one or more locations, in which the systems, components, and techniques described below can be implemented.

The example quantum annealing device 300 includes a quantum system 302, control devices 304 and classical processors 306. The type of quantum system 302 included in the quantum annealing device 300 is dependent on the type of computations to be performed by the device 300. Generally, the quantum system 302 includes one or more interacting quantum subsystems, e.g., one or more interacting qubits. For example, the quantum system 302 may include an interacting spin chain, e.g., a strongly disordered spin chain as described above with reference to FIGS. 1 and 2. In other examples the quantum system 302 may include higher dimensional systems.

The type of control devices 304 included in the quantum annealing device 300 is dependent on the type of computations to be performed by the device 300 and the types of qubits included in the quantum system 302. For example, the control devices 304 may include devices that generate time dependent magnetic fields, e.g., that can be modulated by the classical processors and applied to the quantum system 302. The control devices 304 may further include waveform generators or measurement devices, e.g., readout resonators. In some cases, e.g., in cases where individual control devices 304 may be directly coupled to one or more qubits in the quantum system 302, e.g., through individual or global control lines.

The classical processors 306 operate the quantum system 302 via the control devices 304. For example, the classical processors 306 may cause the control devices 304 to implement a particular annealing schedule on the quantum system. This may include preparing the quantum system 302 in an initial state governed by an initial Hamiltonian, e.g., by causing the control devices to set interaction strengths and other Hamiltonian parameters to initial values. A control field, e.g., a transverse magnetic field, may then be applied to the quantum system via the control devices 304, e.g., via a control device configured to apply magnetic fields of varying strengths to the quantum system 302. The control field may take the form of the inhomogeneous driving fields described above with reference to FIGS. 1 and 2. More specifically, the inhomogeneous driving field may be a specially designed driving field that creates an effective gap between low energy states and higher energy states (e.g., between the ground state and first excited state, between the first excited state and second excited state, or between any other preselected energy eigenstates relevant to the computation being performed) of the quantum system 302. The quantum system may then be measured to obtain a measurement result, e.g., that represents a solution to the computation being performed by the quantum annealing device 300.

In some implementations the techniques described in this specification can be combined with other classical heuristic solvers for optimization, such as Parallel Tempering. For example, the techniques described in this specification can be used in lieu of the quantum-classical annealing procedures described in PCT/US2016/069381 "Quantum assisted optimization", the entire contents of which are incorporated herein by reference. In these implementations, the techniques can be physically realized as quantum and classical hybrid co-processor on the same chip, as described in PCT/US2015/022035 "Chips including classical and quantum computing processors", the entire contents of which are incorporated herein by reference.

In some implementations the techniques described in this specification may be implemented using the quantum hardware disclosed in PCT/US2014/072962, "Constructing and programming quantum hardware for quantum annealing processes," the entire contents of which are incorporated herein by reference.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method for performing algorithmic quantum annealing using a quantum system comprising a spin chain, comprising:
controlling the quantum system such that a total Hamiltonian characterizing the quantum system evolves from an initial quantum Hamiltonian to a problem quantum Hamiltonian, wherein
the energy spectrum of the problem Hamiltonian encodes a solution to a computational task, and
controlling the quantum system comprises applying inhomogeneous driving fields to the quantum system to drive a state of the quantum system from an initial state across a quantum phase transition to a final state, wherein clusters of spins included in the spin chain are driven separately from one another by each respective inhomogeneous driving field.

2. The method of claim 1, wherein controlling the quantum system further comprises:
driving, by the applied inhomogeneous driving field, the quantum system across a quantum phase transition.

3. The method of claim 1, wherein the method further comprises performing one or more measurements of the energy of the quantum system to determine the solution to the computational task.

4. The method of claim 1, wherein the computational task comprises an optimization task.

5. The method of claim 1, and wherein the inhomogeneous driving fields comprise transverse fields that can be locally modulated for each spin in the spin chain.

6. A method for performing algorithmic quantum annealing using a quantum system, the method comprising:
controlling the quantum system such that a total Hamiltonian characterizing the quantum system evolves from an initial quantum Hamiltonian to a problem quantum Hamiltonian, wherein
the energy spectrum of the problem Hamiltonian encodes a solution to a computational task, and
controlling the quantum system comprises applying an inhomogeneous driving field to the quantum system, wherein applying the inhomogeneous driving field to the quantum system causes quantum fluctuations and the quantum system responds to the quantum fluctuations within multiple clusters of the quantum system, wherein the inhomogeneous driving field is given by:

$$g(n,t)=\omega_0 g_0(n)v_0(t)+\Sigma_{k=1}^{M}\omega_k g_k(\|n-n_k\|-v_k(n,t)t)$$

wherein $g_0$ represents a time-independent global magnetic field which has a spatial structure, $v_0(t)$ represents a critical-front velocity which is spatially uniform and has non-linear dependence to time, $g_k$ represents the non-separable spatiotemporal modulation of the drive field, and M represents the total number of clusters.

7. The method of claim 6, wherein the inhomogeneous driving field is characterized by set of effective hyper-parameters describing the spatial structure and velocities of a critical front, the hyper-parameters including (i) a shape in space, (ii) horizontal velocity, and (iii) vertical velocity.

8. The method of claim 7, wherein the (i) horizontal velocity, (ii) vertical velocity, and (iii) inhomogeneity slope are given by $$v^v(n,t) = -\partial g(n,t)/\partial t, \; v_k^h(n,t) = \partial n(g_{fix},t)/\partial t, \text{ and}$$
$$\alpha(n,t) = \frac{\partial g(n,t)}{\partial n}.$$

9. The method of claim 8, wherein the inhomogeneous driving field comprises space and time separated inhomogeneity.

10. The method of claim 9, wherein the inhomogeneous driving field is given by $g(n,t)=g_0(n)v_0(t)$.

11. The method of claim 8, wherein the inhomogeneous driving field comprises a periodic spatial inhomogeneity combined with spatially independent time-local inhomogeneity.

12. The method of claim 11, wherein the inhomogeneous driving field comprises a single standing wave.

13. The method of claim 12, wherein the (i) horizontal velocity, (ii) vertical velocity, and (iii) inhomogeneity slope are given by $$v^v(t) = a\sin(kn+\varphi)\dot{v}_o(t)$$
$$v^h(n,t) = \frac{-ag_{fix}\dot{v}_o(t)}{kv_o^2(t)\sqrt{1-[g_{fix}/av_o(t)]^2}}.$$
$$\alpha(n,t) = ak\cos(kn+\varphi)\dot{v}_o(t)$$

14. The method of claim 8, wherein the inhomogeneous driving field comprises spatiotemporal inhomogeneities.

15. The method of claim 14, wherein the inhomogeneous driving field comprises a locally linear function.

16. The method of claim 14, wherein the inhomogeneous driving field is given by $g(n,t)=g_c\{1+\Sigma_{k=2}^{M}\omega_k \tanh[\theta_k(\|n-n_k\|-v_k(n)t)]\}$.

17. The method of claim 16, wherein the activation function $\tanh[\theta_k(\|n-n_k\|-v_k(n)t)]$ is linearized in each cluster near the quantum critical point.

18. A method for performing algorithmic quantum annealing using a quantum system, comprising:
controlling the quantum system such that a total Hamiltonian characterizing the quantum system evolves from an initial quantum Hamiltonian to a problem quantum Hamiltonian, wherein
the energy spectrum of the problem Hamiltonian encodes a solution to a computational task, and controlling the quantum system comprises applying an inhomogeneous driving field to the quantum system and applying a causality control strategy.

19. A method for performing algorithmic quantum annealing using a quantum system, comprising:
controlling the quantum system such that a total Hamiltonian characterizing the quantum system evolves from an initial quantum Hamiltonian to a problem quantum Hamiltonian, wherein
the energy spectrum of the problem Hamiltonian encodes a solution to a computational task, and
controlling the quantum system comprises applying an inhomogeneous driving field to the quantum system, wherein the inhomogeneous driving field comprises one or more critical fronts, and wherein the velocities of the one or more critical fronts are below a threshold value that conserves effective inhomogeneity.

20. A method for performing algorithmic quantum annealing using a quantum system, comprising:
controlling the quantum system such that a total Hamiltonian characterizing the quantum system evolves from an initial quantum Hamiltonian to a problem quantum Hamiltonian, wherein
the energy spectrum of the problem Hamiltonian encodes a solution to a computational task, and
controlling the quantum system comprises applying an inhomogeneous driving field to the quantum system, wherein applying the inhomogeneous driving field comprises applying an inhomogeneous driving field that creates an effective gap between low energy states and higher energy states of the quantum system.

21. A quantum annealing device comprising:
a quantum system comprising a spin chain;
one or more control devices that operate on the quantum system; and
one or more classical processors,
wherein the one or more classical processors and control devices are configured to perform operations comprising:
controlling the quantum system such that a total Hamiltonian characterizing the quantum system evolves from an initial quantum Hamiltonian to a problem quantum Hamiltonian, wherein
the energy spectrum of the problem Hamiltonian encodes a solution to a computational task, and
controlling the quantum system comprises applying inhomogeneous driving fields to the quantum system to drive a state of the quantum system from an initial state across a quantum phase transition to a final state, wherein clusters of spins included in the spin chain are driven separately from one another by each respective inhomogeneous driving field.

22. A method for performing algorithmic quantum annealing using a quantum system comprising a spin chain, comprising:
controlling the quantum system such that a total Hamiltonian characterizing the quantum system evolves from an initial quantum Hamiltonian to a problem quantum Hamiltonian, wherein controlling the quantum system comprises:
applying inhomogeneous driving fields to the quantum system; and
driving, by the inhomogeneous driving fields, the quantum system across a quantum phase transition, wherein clusters of spins included in the spin chain are driven separately from one another by each respective inhomogeneous driving field.

23. The method of claim 22, wherein the inhomogeneous driving field comprises a transverse field that can be locally modulated for each spin in the spin chain.

24. A method for performing algorithmic quantum annealing using a quantum system, the method comprising:
controlling the quantum system such that a total Hamiltonian characterizing the quantum system evolves from an initial quantum Hamiltonian to a problem quantum Hamiltonian, wherein the energy spectrum of the problem Hamiltonian encodes a solution to a computational task and wherein controlling the quantum system comprises:
applying an inhomogeneous driving field to the quantum system;
driving, by the inhomogeneous driving field, the quantum system across a quantum phase transition; and
performing one or more measurements of the energy of the quantum system to determine the solution to the computational task.

25. The method of claim 24, wherein the computational task comprises an optimization task.

26. A method for performing algorithmic quantum annealing using a quantum system, the method comprising:
controlling the quantum system such that a total Hamiltonian characterizing the quantum system evolves from an initial quantum Hamiltonian to a problem quantum Hamiltonian, wherein controlling the quantum system comprises:
applying an inhomogeneous driving field to the quantum system, wherein applying the inhomogeneous driving field to the quantum system causes quantum fluctuations and the quantum system responds to the quantum fluctuations within multiple clusters of the quantum system; and
driving, by the inhomogeneous driving field, the quantum system across a quantum phase transition, wherein the inhomogeneous driving field is given by:

$$g(n,t)=\omega_0 g_0(n)v_0(t)+\Sigma_{k=1}^{M}\omega_k g_k(\|n-n_k\|-v_k(n,t)t)$$

wherein $g_0$ represents a time-independent global magnetic field which has a spatial structure, $v_0(t)$ represents a critical-front velocity which is spatially uniform and has non-linear dependence to time, $g_k$ represents the non-separable spatiotemporal modulation of the drive field, and M represents the total number of clusters.

27. A method for performing algorithmic quantum annealing using a quantum system, the method comprising:
controlling the quantum system such that a total Hamiltonian characterizing the quantum system evolves from an initial quantum Hamiltonian to a problem quantum Hamiltonian, wherein controlling the quantum system comprises:
applying an inhomogeneous driving field to the quantum system, wherein the inhomogeneous driving field is characterized by set of effective hyper-parameters describing the spatial structure and velocities of a critical front, the hyper-parameters including (i) a shape in space, (ii) horizontal velocity, and (iii) vertical velocity; and
driving, by the inhomogeneous driving field, the quantum system across a quantum phase transition.

28. The method of claim 27, wherein the (i) horizontal velocity, (ii) vertical velocity, and (iii) inhomogeneity slope are given by $v^v(n, t) = -\partial g(n, t)/\partial t$, $v_k^h(n, t) = \partial n(g_{fix}, t)/\partial t$, and $$\alpha(n, t) = \frac{\partial g(n, t)}{\partial n}.$$

29. The method of claim 28, wherein the inhomogeneous driving field comprises space and time separated inhomogeneity.

30. The method of claim 29, wherein the inhomogeneous driving field is given by $g(n,t)=g_0(n)v_0(t)$.

31. The method of claim 29, wherein the inhomogeneous driving field comprises a periodic spatial inhomogeneity combined with spatially independent time-local inhomogeneity.

32. The method of claim 31, wherein the inhomogeneous driving field comprises a single standing wave.

33. The method of claim 32, wherein the (i) horizontal velocity, (ii) vertical velocity, and (iii) inhomogeneity slope are given by $$v^v(t) = a\sin(kn + \varphi)\dot{v}_o(t)$$

$$v^h(n, t) = \frac{-ag_{fix}\dot{v}_o(t)}{kv_o^2(t)\sqrt{1 - [g_{fix}/av_o(t)]^2}}.$$

$$\alpha(n, t) = ak\cos(kn + \varphi)\dot{v}_o(t)$$

34. The method of claim 28, wherein the inhomogeneous driving field comprises spatiotemporal inhomogeneities.

35. The method of claim 34, wherein the inhomogeneous driving field comprises a locally linear function.

36. The method of claim 34, wherein the inhomogeneous driving field is given by $g(n,t)=g_c\{1+\Sigma_{k=2}^{M}\omega_k \tanh[\theta_k(\|n-n_k\|-v_k(n)t)]\}$.

37. The method of claim 36, wherein the activation function $\tanh[\theta_k(\|n-n_k\|-v_k(n)t)]$ is linearized in each cluster near the quantum critical point.

38. A method for performing algorithmic quantum annealing using a quantum system, the method comprising:
controlling the quantum system such that a total Hamiltonian characterizing the quantum system evolves from an initial quantum Hamiltonian to a problem quantum Hamiltonian, wherein controlling the quantum system comprises:
applying an inhomogeneous driving field to the quantum system;
driving, by the inhomogeneous driving field, the quantum system across a quantum phase transition; and
applying a causality control strategy.

39. A method for performing algorithmic quantum annealing using a quantum system, the method comprising:
controlling the quantum system such that a total Hamiltonian characterizing the quantum system evolves from an initial quantum Hamiltonian to a problem quantum Hamiltonian, wherein controlling the quantum system comprises:
applying an inhomogeneous driving field to the quantum system, wherein the inhomogeneous driving field comprises one or more critical fronts, and wherein the velocities of the one or more critical fronts are below a threshold value that conserves effective inhomogeneity; and
driving, by the inhomogeneous driving field, the quantum system across a quantum phase transition.

40. A method for performing algorithmic quantum annealing using a quantum system, the method comprising:
controlling the quantum system such that a total Hamiltonian characterizing the quantum system evolves from an initial quantum Hamiltonian to a problem quantum Hamiltonian, wherein controlling the quantum system comprises:
applying an inhomogeneous driving field to the quantum system, wherein applying the inhomogeneous driving field comprises applying an inhomogeneous driving field that creates an effective gap between low energy states and higher energy states of the quantum system; and
driving, by the inhomogeneous driving field, the quantum system across a quantum phase transition.

41. A quantum annealing device comprising:
a quantum system comprising a spin chain;
one or more control devices that operate on the quantum system; and
one or more classical processors,
wherein the one or more classical processors and control devices are configured to perform operations comprising:
controlling the quantum system such that a total Hamiltonian characterizing the quantum system evolves from an initial quantum Hamiltonian to a problem quantum Hamiltonian, wherein controlling the quantum system comprises:
applying inhomogeneous driving fields to the quantum system; and
driving, by the inhomogeneous driving field, the quantum system across a quantum phase transition, wherein clusters of spins included in the spin chain are driven separately from one another by each respective inhomogeneous driving field.

* * * * *